US012152591B2

United States Patent
Amann et al.

(10) Patent No.: US 12,152,591 B2
(45) Date of Patent: Nov. 26, 2024

(54) BARREL CASING PUMP AND METHOD FOR MANUFACTURING A BARREL CASING PUMP

(71) Applicant: KSB SE & Co. KGaA, Frankenthal (DE)

(72) Inventors: Peter Amann, Birkenheide (DE); Holger Lutz, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 354 days.

(21) Appl. No.: 17/440,385

(22) PCT Filed: Mar. 4, 2020

(86) PCT No.: PCT/EP2020/055622
§ 371 (c)(1),
(2) Date: Sep. 17, 2021

(87) PCT Pub. No.: WO2020/187562
PCT Pub. Date: Sep. 24, 2020

(65) Prior Publication Data

US 2022/0163037 A1 May 26, 2022

(30) Foreign Application Priority Data

Mar. 19, 2019 (DE) ..................... 10 2019 001 882.6

(51) Int. Cl.
*F04D 1/06* (2006.01)
*F04D 29/42* (2006.01)
*F04D 29/44* (2006.01)

(52) U.S. Cl.
CPC ........... *F04D 1/063* (2013.01); *F04D 29/426* (2013.01); *F04D 29/445* (2013.01); *F05D 2250/52* (2013.01)

(58) Field of Classification Search
CPC . F04D 1/063; F04D 1/06; F04D 17/12; F04D 17/122; F04D 17/125;
(Continued)

(56) References Cited

U.S. PATENT DOCUMENTS 3,188,966 A * 6/1965 Tetlow ................. F04D 29/426 415/196
3,289,923 A 12/1966 Millman
(Continued)

FOREIGN PATENT DOCUMENTS

DE 1 528 642 A1 5/1969
DE 43 10 467 A1 10/1994
(Continued)

OTHER PUBLICATIONS

English Translation of JP2006152849A, generated from Espacenet website Nov. 30, 2023. (Year: 2023).*
(Continued)

*Primary Examiner* — Bryan M Lettman
(74) *Attorney, Agent, or Firm* — Crowell & Moring LLP

(57) ABSTRACT

A centrifugal pump having a barrel casing and at least one stage casing therein includes a transition from the last stage casing to the pressure connector of the barrel casing in the form of a spiral flow space. The contour of the spiral flow space is formed by a contour of the last stage casing, a contour of a cover which closes the barrel casing on an end face, and an inner contour of the barrel casing.

12 Claims, 6 Drawing Sheets

(58) Field of Classification Search
CPC .... F04D 29/426; F04D 29/4293; F04D 29/44; F04D 29/441; F04D 29/445; F05D 2250/52
See application file for complete search history.

(56) References Cited

U.S. PATENT DOCUMENTS

| | | | | | |
|---|---|---|---|---|---|
| 3,647,314 | A * | 3/1972 | Laessig | F04D 29/186 | 415/206 |
| 5,076,758 | A * | 12/1991 | Palgrave | F04D 29/445 | 415/196 |
| 5,114,311 | A | 5/1992 | Becker et al. | | |
| 5,522,701 | A * | 6/1996 | Nicklas | F04D 29/445 | 415/199.1 |
| 8,062,006 | B2 * | 11/2011 | Hummel | F01D 9/026 | 415/203 |
| 2005/0069427 | A1 * | 3/2005 | Roemuss | F01D 9/026 | 417/407 |
| 2012/0171014 | A1 | 7/2012 | Nagahara et al. | | |
| 2017/0218959 | A1 | 8/2017 | Ebert et al. | | |
| 2020/0300252 | A1 * | 9/2020 | Yamashita | F04D 17/122 | |

FOREIGN PATENT DOCUMENTS

| | | | |
|---|---|---|---|
| DE | 20 2006 011 858 | U1 | 1/2008 |
| DE | 10 2006 021 245 | B4 | 3/2008 |
| DE | 10 2014 214 805 | A1 | 2/2016 |
| EP | 0 443 354 | A1 | 8/1991 |
| EP | 0 618 369 | A1 | 10/1994 |
| EP | 2 653 727 | A1 | 10/2013 |
| JP | 2006152849 | A * | 6/2006 |
| KR | 10-2019-0004646 | A | 1/2019 |
| RU | 57 399 | U1 | 10/2006 |
| RU | 2 448 275 | C1 | 4/2012 |
| RU | 165 532 | U1 | 10/2016 |

OTHER PUBLICATIONS

International Search Report (PCT/ISA/210) issued in PCT Application No. PCT/EP2020/055622 dated Jun. 19, 2020 with English translation (five (5) pages).

German-language Written Opinion (PCT/ISA/237) issued in PCT Application No. PCT/EP2020/055622 dated Jun. 19, 2020 (five (5) pages).

German-language Office Action issued in German Application No. 10 2019 001 882.6 dated Feb. 13, 2020 (four (4) pages).

Hindi-language Office Action issued in Indian Application No. 202137035842 dated Jul. 27, 2023 with English translation (6 pages).

Russian-language Office Action issued in Russian Application No. 2021124280/12(051053) dated Jun. 29, 2023 (2 pages).

International Preliminary Report on Patentability (PCT/IB/338 & PCT/IB/373) issued in PCT Application No. PCT/EP2020/055622 dated Sep. 30, 2021, including English translation (Japanese- language Written Opinion (PCT/ISA/237) filed on Sep. 17, 2021) (six (6) pages).

* cited by examiner

BARREL CASING PUMP AND METHOD FOR MANUFACTURING A BARREL CASING PUMP

BACKGROUND AND SUMMARY OF THE INVENTION

The invention relates to a centrifugal pump having a barrel casing and at least one stage casing which is inserted therein.

Such centrifugal pumps, also referred to as double-casing or barrel casing pumps, are centrifugal pumps which are surrounded by a barrel-like casing. The barrel casing which is provided with suction nozzles and pressure nozzles is closed with a cover in a plane located perpendicularly to the shaft. Generally, in this instance, these are multi-stage pumps for use as high-pressure and extremely high-pressure pumps, in particular also as boiler feed pumps. Within the barrel casing, a plurality of stage casings are arranged in series in an axial direction one behind the other. Each stage casing comprises a pump impeller and optionally a stationary guide wheel.

The individual stage casings are generally constructed together with the pump shaft as a coherent pump insertion module. The flow transition from the last guide wheel or the last stage casing in the pressure nozzles is generally carried out via a flow space which is formed in the barrel casing. In exceptional cases, a separate insert is alternatively used for an end helix in the transition region. The end helix is produced by means of a separate cast component in which the helical contour is milled.

Since the helical contour of the separate casing insert is developed in an optimum manner in terms of flow technology, but this additional component does not contribute to the strength of the pressure casing, the periphery of the barrel casing and the pressure nozzle thereby has to be constructed to be significantly larger in order to modify the helical contour used. Consequently, a pump configuration with a helix insert is considerably larger than a pump configuration with conventional flow space, which ultimately significantly increases the production costs particularly with large pump types.

An object of the invention is therefore to develop a generic pump with an end helix which is significantly simpler and therefore also more cost-effective to produce.

This object is achieved with a centrifugal pump according to the features of claim 1. Advantageous embodiments of the centrifugal pump are set out in the dependent claims.

According to the invention, it is proposed that, in the transition region from the last stage casing into the pressure nozzle of the barrel casing, a helical flow space is formed at least partially directly by means of the inner contour of the barrel casing. The helical contour is absolutely not produced by a separate insertion component, but instead components which are provided in any case are used. However, the helical contour is produced not only by the inner contour of the barrel casing in the transition region, but also in combination with an adjacent contour of the last stage casing and an adjacent contour of a cover which is inserted at the end side into the barrel casing. The end helix is accordingly composed of a plurality, in particular at least three components.

Against this background, a separate helix insert, as was provided in the prior art, can be dispensed with completely. The pump is thereby significantly simpler and more cost-effective to produce. In particular, the respective contour of the components should be produced using conventional processing methods. The additional costs should be kept low by the simple production.

In addition, the pump with the multi-component, in particular three-piece end helix should not have larger dimensions than without an end helix, that is to say, the barrel casing is ideally not larger compared with a comparable pump with an end-side flow space. In order to achieve this, the available space with a comparable pump with flow space is assumed to be a fixed requirement for the sizing of the barrel casing. Depending on the prescribed available structural space of the barrel casing, attempts are then made to produce the best possible helical flow region in the transition region by means of cooperation of the above-mentioned components. Where applicable, it is accepted that the resulting helical contour is not ideal in technical flow terms, but the pump nonetheless does not have larger dimensions.

An object of the invention is thus to obtain a maximum increase of the efficiency of the last pump stage with a helical contour which is not ideal. Since, as a result of the end helix, the loss level of the last stage can be significantly reduced, the influence on the overall pump efficiency is also marked.

During the production of the inner contour of the barrel casing and in particular in order to optimize the helical shape, there may be provision for at least one redirection component to be welded inside the barrel casing after the processing of the inner contour. The welding of a corresponding redirection component in the region of the pump nose of the end helix is advantageous. Ideally, this redirection component is the only additional component.

According to a preferred embodiment, the shaped helical flow space is characterized in that it expands initially radially from the nose in the flow direction, in particular increasingly, ideally expands increasingly in a consistent manner. In addition, it is preferable for the flow region over this periphery to have a constant axial expansion. However, it is theoretically also conceivable for the flow region in this region to also expand axially.

According to another preferred embodiment, the radial expansion remains constant from a defined peripheral angle, wherein the angle is within a range from approximately 45° to approximately 135° and preferably has an angle of approximately 90°. It is advantageous for the flow space to axially expand from this angle.

In a particularly preferred manner, the contour of the end-side cover and the contour of the last stage casing act as a lateral guiding wall of the helical flow space formed.

The centrifugal pump may in addition to the one or more pump wheels or impellers of the individual pump stages also comprise one or more guide wheels, wherein in particular one guide wheel is provided per stage. Furthermore, at least one guide wheel is arranged in the transition region from the last stage casing when viewed in the flow direction in the pressure nozzles. The inner diameter of the helical flow space can thereby be adapted to the guide wheel outer diameter, that is to say, can substantially correspond to it.

According to a preferred embodiment, the centrifugal pump is a feed pump, in particular a boiler feed pump for a power station. The advantageous use of such a centrifugal pump as a feed pump, in particular a barrel feed pump for a power station, is consequently also within the scope of the invention.

In addition to the centrifugal pump, another aspect of the invention also relates to a method for manufacturing a centrifugal pump according to the invention. This is initially based on a conventional centrifugal pump construction having a barrel casing and conventional flow space in the transition region of the last stage casing to the pressure nozzle. This means that, in order to produce the centrifugal pump according to the invention, almost identical outer dimensions of the barrel casing are assumed. Based on this provision and the spatial conditions in the transition region of the last pump stage to the pressure nozzle, initially a 3D template, that is to say, a three-dimensional model of the desired helical space is produced. The template is in this instance produced taking into account the maximum possible flow space diameter and the available flow space width. The three-dimensional template is generally a digital template.

In the transition region under consideration, there is optionally also at least one guide wheel provided, therefore the outer diameter thereof must also be taken into account for the template design, in particular the inner diameter of the desired helical space is adapted to the outer diameter of the guide wheel.

The template which is produced is subsequently used as a pattern for processing the contours of the components for constructing the end helix, that is to say, for mechanically processing the inner contour of the barrel casing, the contour of the last stage casing and the relevant contour of the cover.

It is, for example, conceivable that a programmable processing machine which taking into account the template processes and travels the respective contour with the appropriate tool is used for the mechanical processing of the relevant component contours. Particularly suitable is a milling processing operation of the respective contours, in particular by means of shell end mills.

Specifically, it is conceivable for the inner contour of the barrel casing to be travelled in accordance with the pattern of the template from the inner side with a milling tool which is received by means of an angular head by the processing machine in order to produce the helical contour.

If it is necessary to fit, in particular to weld, at least one redirection component within the barrel casing, this component is also produced beforehand in accordance with the pattern of the template, for example, by means of milling, grinding, cold-forming, laser cusing, etcetera.

Other advantages and properties of the invention are intended to be explained in greater detail below with reference to an embodiment illustrated in the drawings.

DETAILED DESCRIPTION

Figure 1:
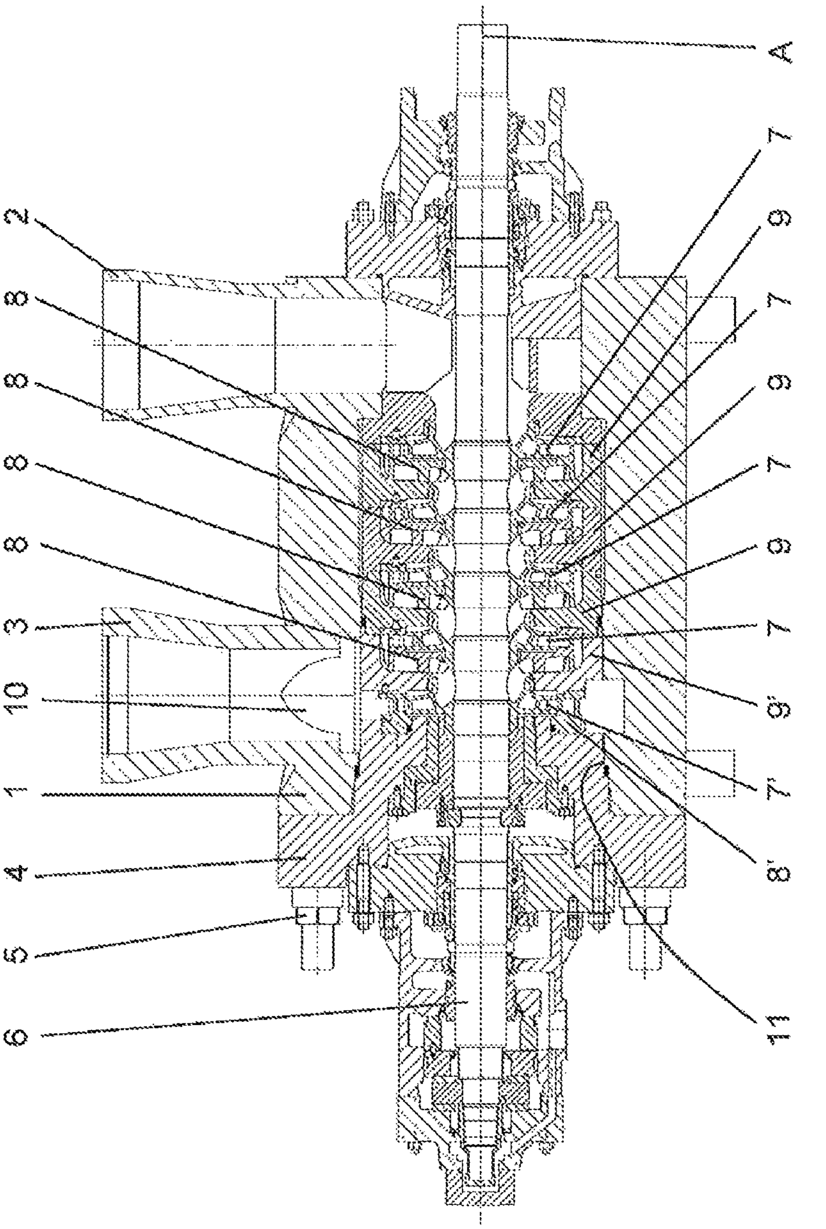
FIG. 1 is a sectioned illustration through the pump according to an embodiment of the invention along the pump shaft, FIGS. 2*a*/2*b* are two sectioned views through the barrel casing of the pump in FIG. 1 in the transition region into the pressure nozzles, FIGS. 3*a*/3*b* are two sectioned illustrations through the assembled pump in accordance with embodiments of the present invention in the transition region into the pressure nozzles, FIGS. 4*a*/4*b* are two illustrations of the processed helical flow space in in accordance with further embodiments of the present invention, FIGS. 5*a*/5*b* are a side view and a plan view of the relevant contour of the last stage casing of the pump of FIG. 1, and FIGS. 6*a*/6*b* are a plan view and a side view of the relevant contour of the end-side cover of the pump in FIG. 1.

FIG. 1 shows a centrifugal pump with a barrel casing 1, which has both a suction nozzle 2 and a pressure nozzle 3. The barrel casing 1 is closed at the pressure-side end thereof by means of a cover 4 which is secured to the barrel casing 1, in particular screwed, via connection means 5.

In the barrel casing 1, there is arranged an insertion module which has a shaft 6 which is arranged so as to be able to be rotated about a rotation axis A. On the shaft 6 a plurality of impellers 7, 7' are arranged one behind the other, whereby the individual, in this instance five, pump stages are formed. Each pump stage further has in addition a stationary guide wheel 8, wherein the last guide wheel when viewed in the flow direction is identified with the reference numeral 8'. The impeller next to the pressure nozzle 3 or last when viewed in the flow direction is designated 7'. In the embodiment, the impellers 7, 7' are radial wheels. Alternatively, for example, semi-axial wheels may also be used. Each impeller 7 is surrounded by a stage casing 9. Adjacent stage casings 9 adjoin each other. The stage casing next to the pressure nozzle 3 or last when viewed in the flow direction is designated 9' and surrounds the impeller 7 which when viewed in the flow direction is arranged in front of the last impeller 7'.

FIG. 1 shows an end helix 10 which is produced in the transition region from the last stage casing 9' in the pressure nozzle 3 by the cooperation of the inner contour 11 of the barrel casing 1 and the contours of the cover 4 and the last stage casing 9'.

Figure 2A:
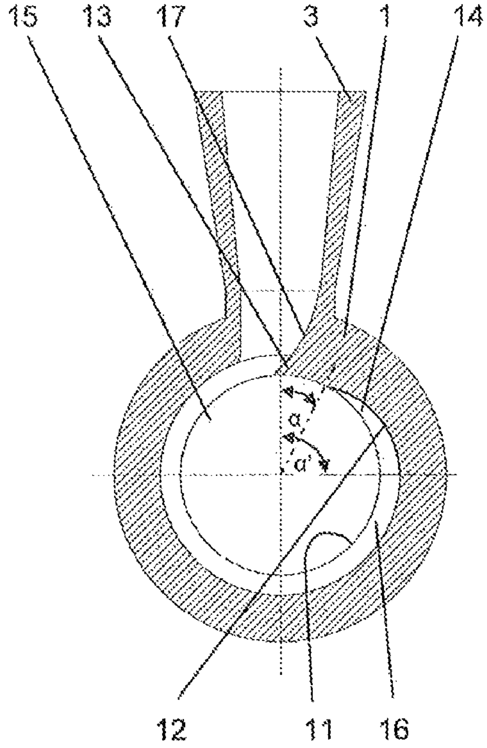
Figure 2B:
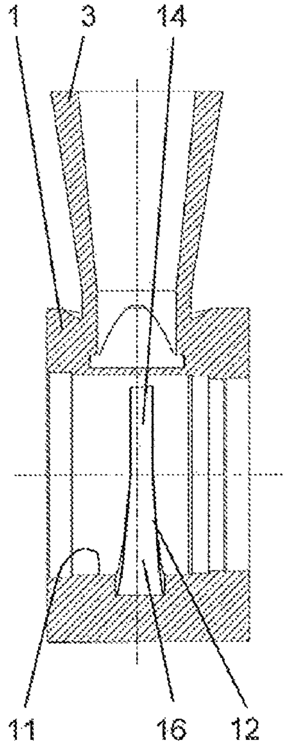

As shown in FIGS. 2*a*, 2*b*, to this end according to the invention the inner contour 11 of the barrel casing 1 in the transition region to the pressure nozzle 3 is brought mechanically to a desired helical contour 12 by means of a milling processing operation. The helical contour 12 begins in the region close to a nose 13 on the pressure nozzle 3 as shown in FIG. 2*a* and provides at the beginning a region 14 which has a radial expansion of an available flow space 15 which increases over the periphery, that is to say, the inner contour 11 of the barrel casing 1 provides an increasing deepening of the inner contour 11 with a constant width. In the embodiment shown, the radial expansion increases at a peripheral angle $\alpha$ of approximately 25° up to a peripheral angle $\alpha'$ of 90°. In alternative embodiments, the increasing radial expansion may extend up to a peripheral angle $\alpha'=135°$.

The region 14 is adjoined by a region 16 of the helical contour 12 in which, in the embodiment shown, the radial expansion remains constant from the angle $\alpha'\sim 90°$ and the helical contour 12 instead still expands only in an axial direction until the helical contour 12 then opens in the pressure nozzle 3. In the region of the nose 13, the original flow space 15 is narrowed in a radial direction by a redirection device 17.

Figure 3A:
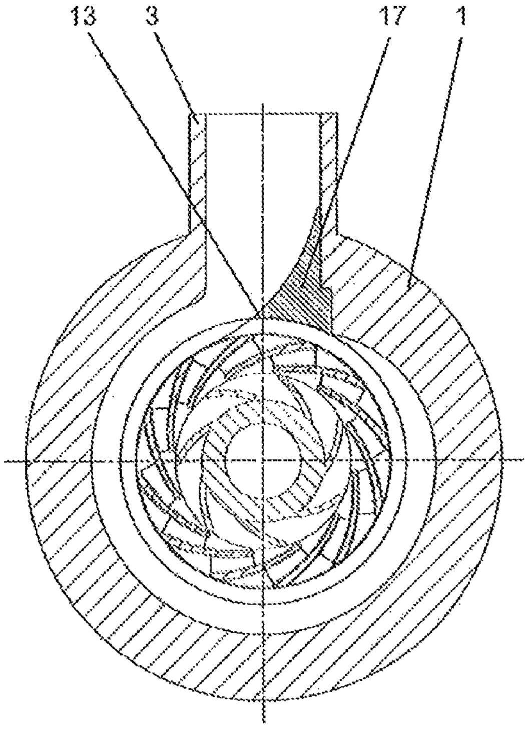
Figure 3B:
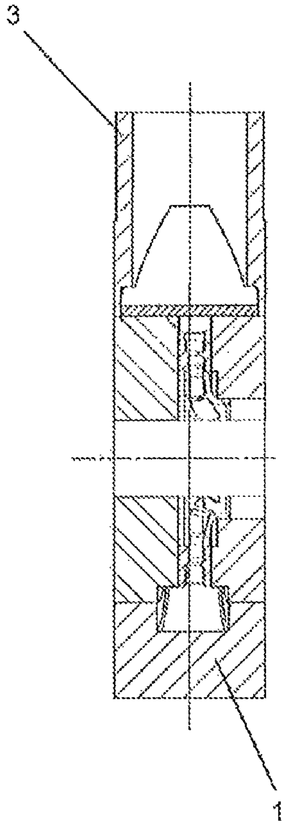

FIGS. 3*a* and 3*b* are sectional illustrations through the assembled pump according to the invention in the transition region in the pressure nozzle 3. As a variant, the redirection device 17 is constructed as a separate component and forms the nose 13. The redirection device 17 is welded in the region of the pressure nozzle 3 to the barrel casing 1.

Figure 4A:
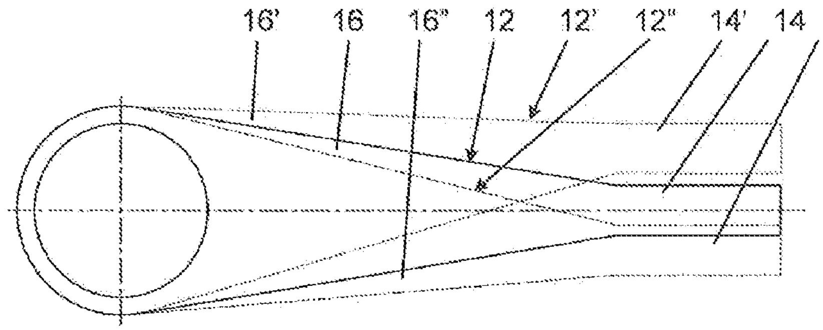
Figure 4B:
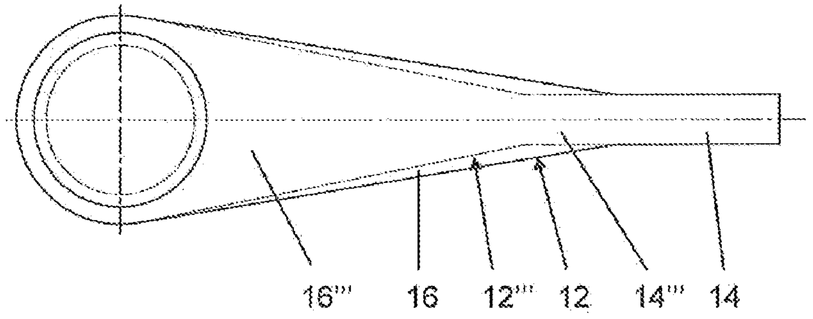

Exemplary developments of the helical contour 12 can be seen in the illustrations of FIGS. 4*a* and 4*b*.

FIG. 4*a* shows as continuous lines that the region 14 and the region 16 of the helical contour 12 are orientated centrally or symmetrically with the pressure nozzle 3. A helical contour 12' which is illustrated with dashed lines or a helical contour 12" which is illustrated with a dot-dash line show further variants, in which the region 14' or 14" are orientated eccentrically or asymmetrically with the pressure nozzle 3. Accordingly, the regions 16' and 16" are orientated eccentrically or asymmetrically with the pressure nozzle 3.

FIG. 4b shows that the length of the region 14 of the helical contour 12 can vary. A helical contour 12' which is illustrated with a dot-dash line has an extended region 14', wherein the region 16''' is constructed in a shortened state. It is self-evident that the length variation shown in FIG. 4b can also be applied to the embodiments of FIG. 4a.

Figure 5A:
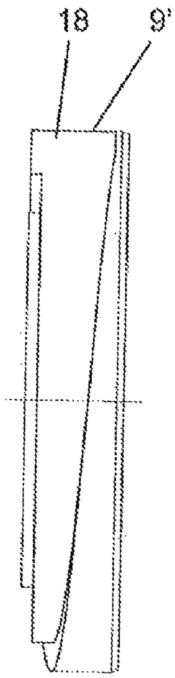
Figure 5B:
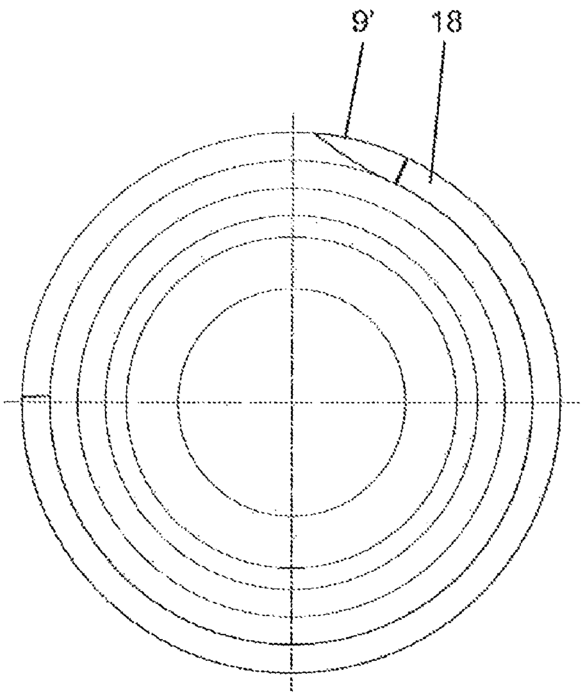

FIGS. 5a, 5b show a partial illustration of the last stage casing 9' in the region of a processed contour 18 which in the assembled pump state forms a guiding wall of the end helix 10 formed.

Figure 6A:
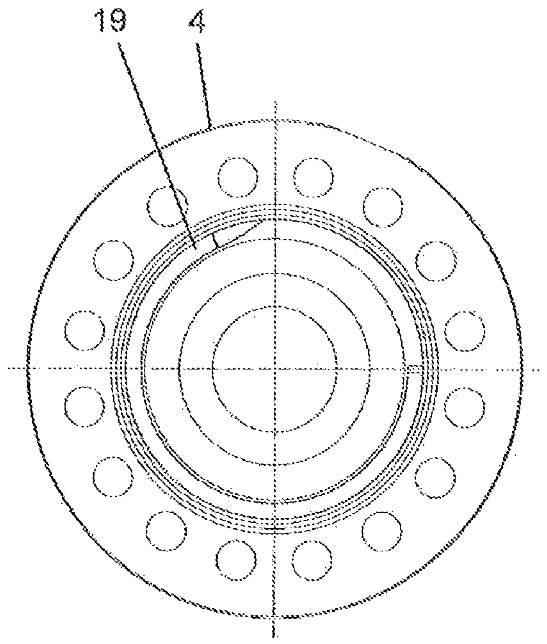
Figure 6B:
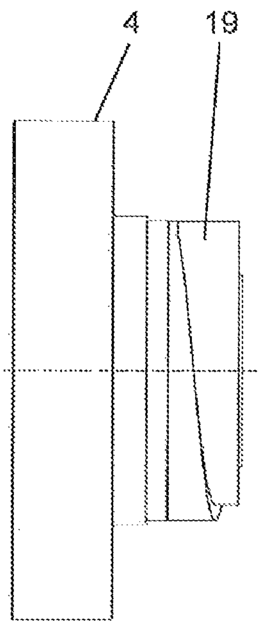

The cover 4 with a significant contour 19 for forming the opposing guiding wall can be seen in the illustrations of FIGS. 6a, 6b.

The multi-component end helix 10, which is constructed in this instance in three pieces, uses a large portion (approximately 80%) of the possible loss level gain of an end helical contour without producing the ideal helical contour. The pump thereby does not have to be constructed in a larger manner. Particularly with multi-stage feed pumps of the barrel casing construction type, a high gain can be achieved in terms of efficiency. The smaller the number of stages, the greater the gain in terms of efficiency. The new structural form, even with feed pumps with radially smaller guide wheels 8', enables an end helix 10 to be integrated without having to construct the pump in a larger manner.

For the production of the pump shown, a 3D helical contour in accordance with the provided guide wheel outer diameter and the maximum possible flow space diameter and the flow space width is first produced in the barrel casing 1 using CAD. The dimensions for the flow space correspond to the specifications for the construction of the pump without a helical contour. The resultant pump with a helical contour therefore does not have larger dimensions.

The axial position between the guide wheel outlet and the pressure nozzle center can be freely selected in the production of the 3D template. The three-dimensional helical contour generated acts as a template for the construction of the three components, that is to say, the barrel casing 1, the stage casing 9' and the pressure-side cover 4 which in the assembled state form the helical flow space 15. The components or the respective contours 11, 18 and 19 can be produced by means of a shell end mill. In order to process the inner contour 11 of the barrel casing 1, there is used a programmable processing machine by means of which via an angular head, in which the milling cutter is received, the three-dimensional helical contour 12 is travelled from the inner side in accordance with the provisions of the template.

For the production of the lateral guiding walls, that is to say, the processing of the contour 19 of the pressure-side cover 4 and the contour 18 of the last stage casing 9', the three-dimensional template of the helical contour 12 is also used. After the processing of the barrel casing 1, that is to say, the production of the helical contour 12, the redirection device 17 additionally has to be welded. This redirection device 17 is also constructed beforehand using the three-dimensional template.

The invention claimed is:

1. A centrifugal pump, comprising:
- a barrel casing;
- a barrel casing cover configured to close an axial end of the barrel casing; and
- at least one stage casing configured to be inserted in the barrel casing, wherein
  - in a transition region from a last stage casing of the at least one stage casing into a pressure nozzle of the barrel casing, a helical flow space is formed by a contour of the last stage casing, a contour of the barrel casing cover, and an inner contour of the barrel casing, and
  - the helical flow space, starting from a nose of the pressure nozzle, increases radially along a flow direction from the last stage casing to the pressure nozzle, while having a constant axial width from the last stage casing to the pressure nozzle.

2. The centrifugal pump as claimed in claim 1, wherein
- at least one redirection device is provided on the barrel casing in the region of a of the nose of the pressure nozzle.

3. The centrifugal pump as claimed in claim 1, wherein
- the helical flow space, from a predetermined peripheral angle from the nose, axially expands in the flow direction, and
- a radial depth of the helical flow space is constant from the predetermined peripheral angle.

4. The centrifugal pump as claimed in claim 3, wherein the predetermine peripheral angle is 90°.

5. The centrifugal pump as claimed in claim 1, wherein
- the contour of the barrel casing cover and the contour of the last stage casing are configured to be lateral guiding walls of the helical flow space.

6. The centrifugal pump as claimed in claim 1, further comprising:
- at least one guide wheel,
- wherein an inner diameter of the helical flow space substantially corresponds to an outer diameter of a last stage one of the at least one guide wheels adjacent to the transition region.

7. The centrifugal pump as claimed in claim 1, wherein the constant axial width extends from a circumferential angle of 90° to a circumferential angle of 135°.

8. A method for manufacturing a centrifugal pump having a barrel casing, a barrel casing cover configured to close an axial end of the barrel casing, and at least one stage casing configured to be inserted in the barrel casing, wherein in a transition region from a last stage casing of the at least one stage casing into a pressure nozzle of the barrel casing, a helical flow space is formed by a contour of the last stage casing, a contour of the barrel casing cover, and an inner contour of the barrel casing, comprising the steps of:
- producing a 3D template for a helical flow space; and
- mechanically processing the barrel casing, barrel casing cover and from a last stage casing of the at least one stage casing using the 3D template,
- wherein the 3D template takes into account a maximum flow space diameter of the barrel casing and the available flow space width at the last stage casing, and
- the helical flow space, starting from a nose of the pressure nozzle, increases radially along a flow direction from the last stage casing to the pressure nozzle, while having a constant axial width from the last stage casing to the pressure nozzle.

9. The method as claimed in claim 8, wherein
- in the mechanical processing step, the contour of the barrel casing in the region of the pressure nozzle is traversed by a processing machine having a milling tool and having an angular head capable of following the 3D template.

10. The method as claimed in claim 9, further comprising the step of:
- after the mechanical processing of the helical contour in the barrel casing, welding a redirection device at a at the nose of the pressure nozzle.

11. The method as claimed in claim 10, wherein the redirection component is configured as defined by the 3D template.

12. The method as claimed in claim 8, wherein the constant axial width extends from a circumferential angle of 90° to a circumferential angle of 135°.

* * * * *